Figure 3:
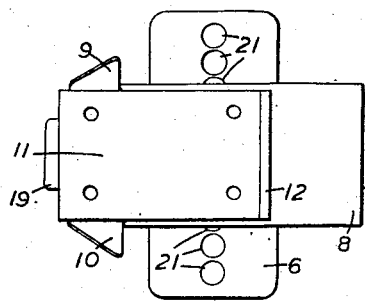

March 9, 1948. C. J. RICE 2,437,403
FASTENING AND HOLDING DEVICE FOR DOORS, GATES, AND THE LIKE
Filed May 6, 1946 6 Sheets-Sheet 1
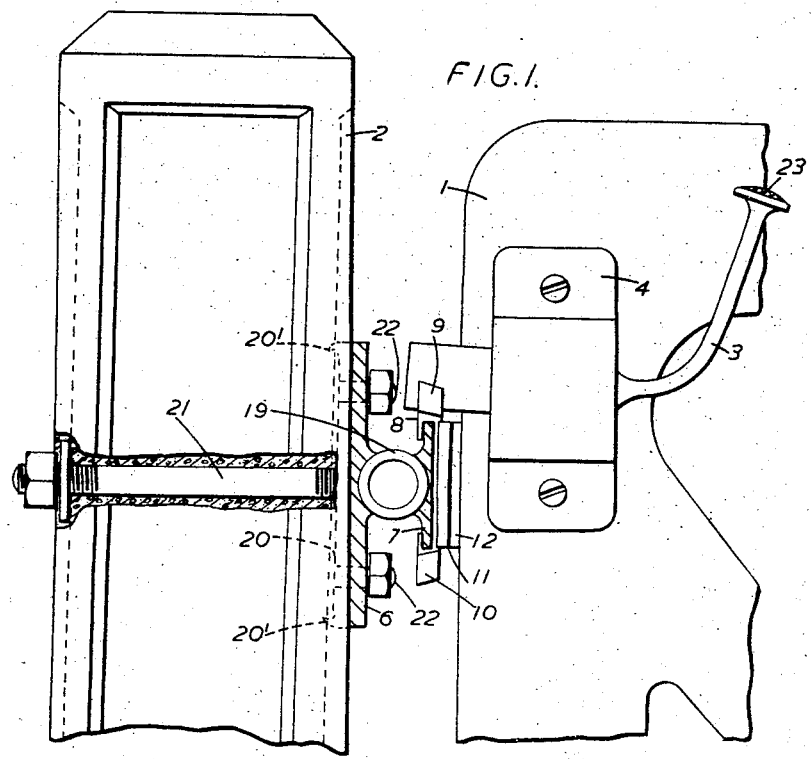
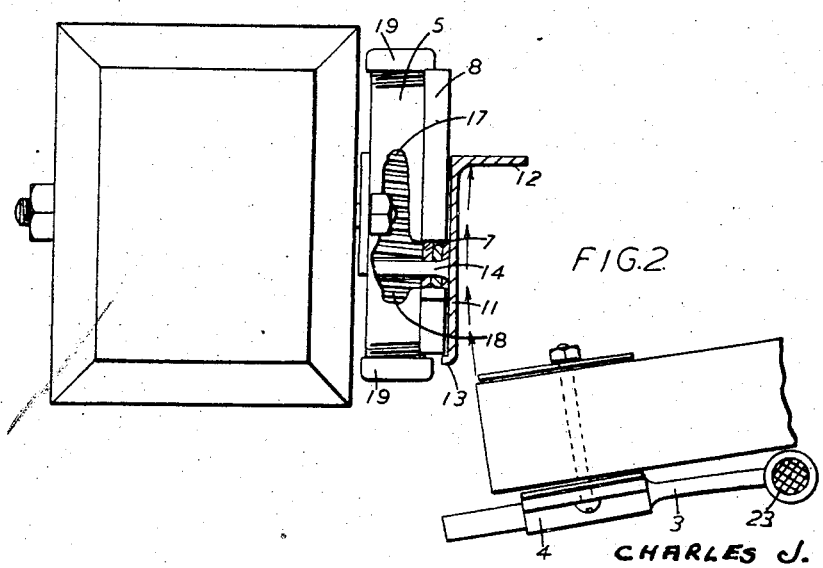
Inventor
CHARLES J. RICE
By
Emery Holcombe & Day
Attorney March 9, 1948. C. J. RICE 2,437,403
FASTENING AND HOLDING DEVICE FOR DOORS, GATES, AND THE LIKE
Filed May 6, 1946 6 Sheets-Sheet 2

CHARLES J. RICE Inventor

By Emery Holcombe & Blair
Attorney

March 9, 1948.   C. J. RICE   2,437,403
FASTENING AND HOLDING DEVICE FOR DOORS, GATES, AND THE LIKE
Filed May 6, 1946   6 Sheets-Sheet 3

Inventor
CHARLES J. RICE
By *Emery,*
*Holcombe & Blair*
Attorney

March 9, 1948. C. J. RICE 2,437,403
FASTENING AND HOLDING DEVICE FOR DOORS, GATES, AND THE LIKE
Filed May 6, 1946 6 Sheets-Sheet 4
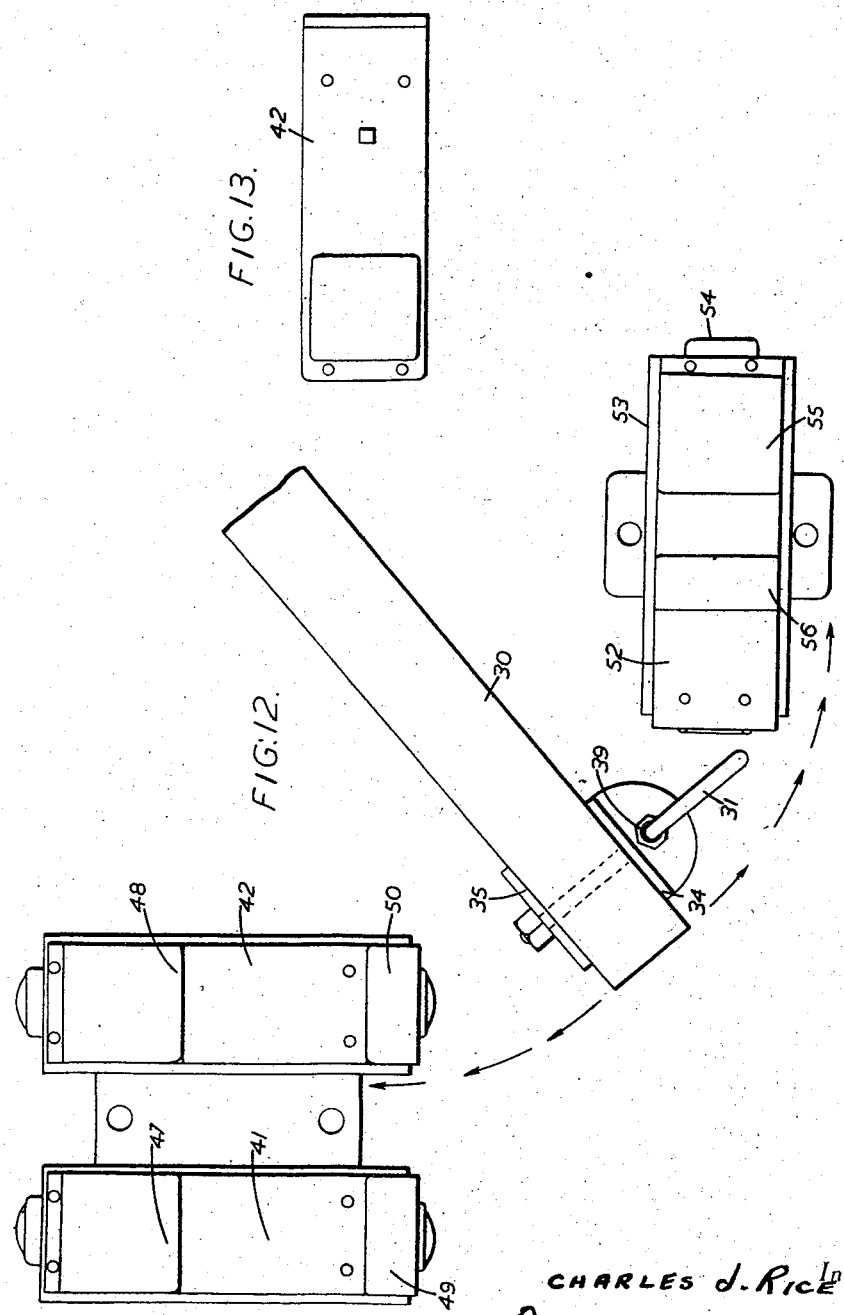
Charles J. Rice Inventor
By Emery Holcombe & Blair
Attorney March 9, 1948.   C. J. RICE   2,437,403
FASTENING AND HOLDING DEVICE FOR DOORS, GATES, AND THE LIKE
Filed May 6, 1946   6 Sheets-Sheet 5
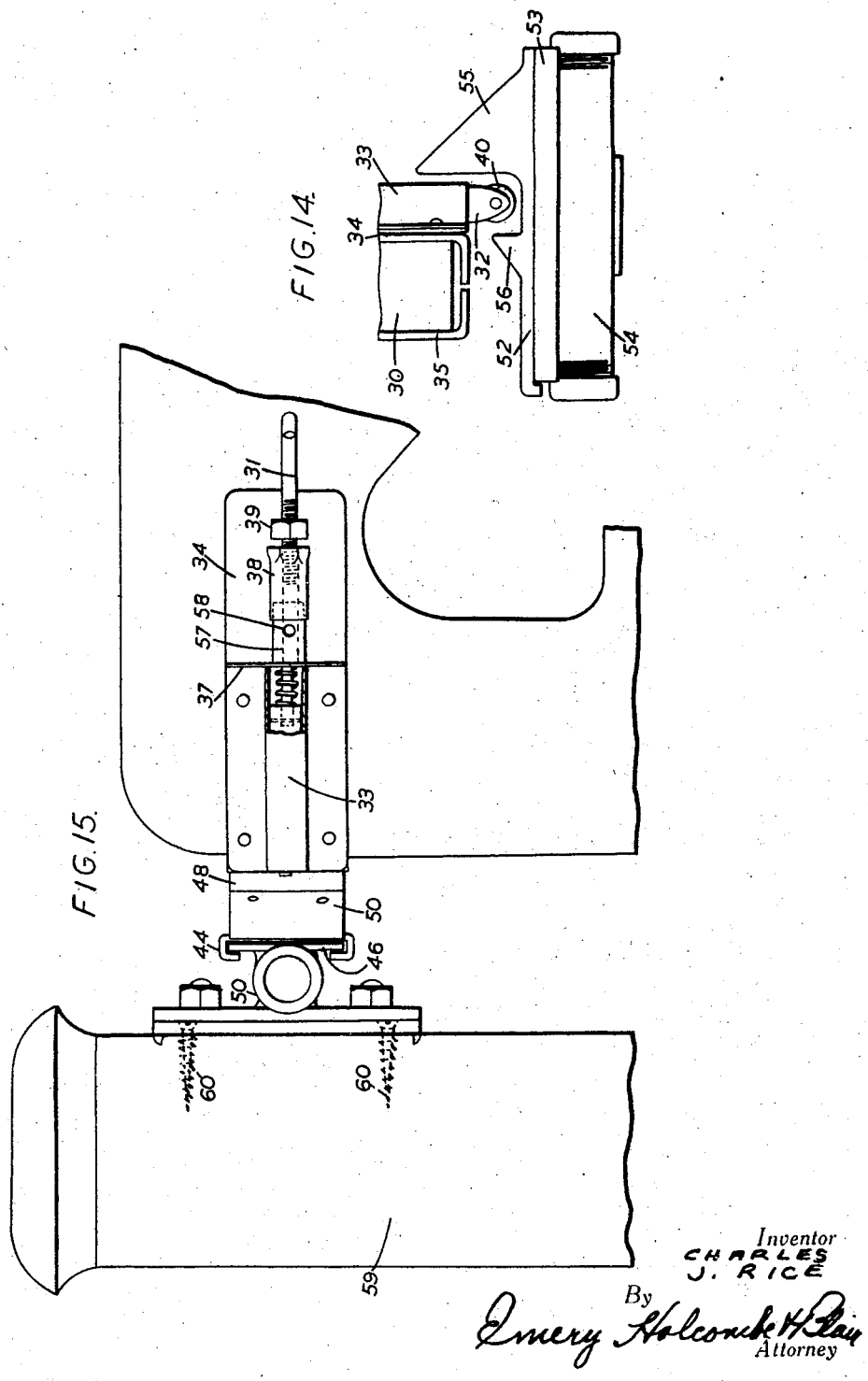
Inventor
CHARLES
J. RICE
By
Emery Holcombe & Clay
Attorney March 9, 1948. C. J. RICE 2,437,403
FASTENING AND HOLDING DEVICE FOR DOORS, GATES, AND THE LIKE
Filed May 6, 1946 6 Sheets-Sheet 6
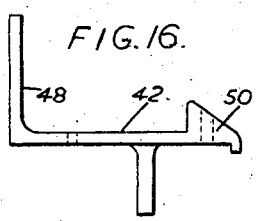
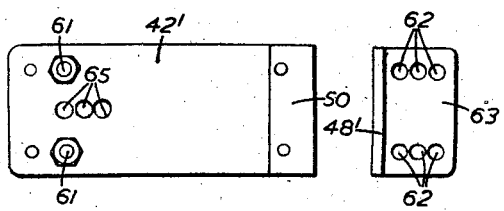
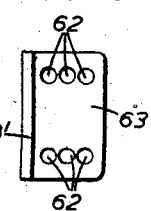
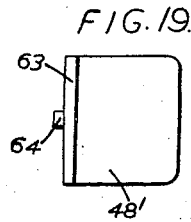
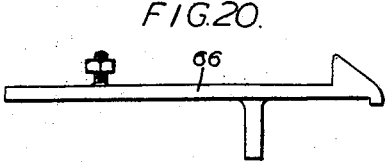
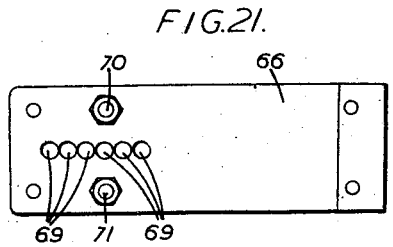
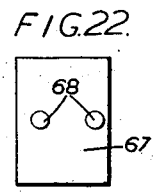
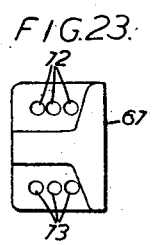
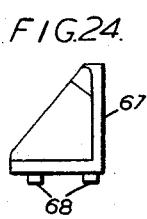
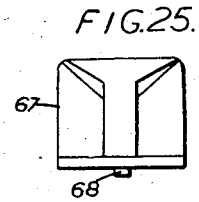
Inventor
CHARLES J. RICE
By
Emery Holcombe & Blair
Attorney Patented Mar. 9, 1948

2,437,403

UNITED STATES PATENT OFFICE 2,437,403

FASTENING AND HOLDING DEVICE FOR DOORS, GATES, AND THE LIKE

Charles John Rice, Bexleyheath, England

Application May 6, 1946, Serial No. 667,659
In Great Britain March 25, 1944

Section 1, Public Law 690, August 8, 1946
Patent expires March 25, 1964

12 Claims. (Cl. 292—340)

This invention relates to improvements in or relating to fastening and holding devices for doors, gates and the like and more particularly to latch mechanism for use in connection with heavy doors, gates and the like. For convenience such doors, gates and the like are hereinafter referred to generically as "gates."

It is well known that damage frequently occurs when heavy gates are allowed forcibly to strike their posts or the like when they reach a limiting position i. e. when they are swung in a closing direction towards the associated post, jamb or the like and when they are swung in an opening direction against a stop. Thus for instance in the case of gates at the end of garage drives and the like the persistent banging quickly leads to breaking up of the gate and/or to damaging the gate post, this tendency being greater as the dimensions and/or weight of the gate increase.

One of the objects of the present invention is to provide fastening means with the aid of which the above mentioned likelihood of damage to gates and/or to their associated frames, posts or the like can be reduced or entirely avoided.

According to the present invention there is provided a fastening device for cooperation with a latch, said device including a body portion, a keeper for cooperation with the latch concerned and an abutment for the gate for which the device is intended, the said keeper and abutment being mounted for sliding movement with respect to said body portion and springs, resilient buffers or the like being provided for offering resilient opposition to said sliding movement.

A device according to the present invention therefore cushions the impact of a gate when the latter is swung towards a limiting position and also affords resilient opposition to any recoil which may result therefrom; at the same time it is ensured that the associated latch will engage the keeper when the gate strikes the above mentioned abutment as said keeper and abutment move together.

One or more fasteners according to the present invention may be associated with the side, top and/or bottom of a gate for cooperation with a suitable latch or latches in maintaining the gate in fully closed and/or fully opened positions as may be desired.

The aforesaid keeper and abutment may be formed integrally or from two or more parts connected together either permanently or adjustably, the last-mentioned arrangement being in many cases desirable as it provides for accommodating gates of various thicknesses.

A fastening device according to the present invention may include one or more keepers so disposed as to enable such device to be applied to a gate irrespective of the side on which the latter is hinged. Thus for instance such device may be provided with two projecting keepers, one extending upwardly and the other extending downwardly so enabling the device to be applied to a right hand gate post or the like in one position or to a left hand gate post or the like in a relatively inverted position.

The body of the aforesaid fastening device may be adapted to be secured directly to the post, jamb or other convenient part of a gateway or the like by means of bolts, screws or the like but I prefer to provide a subsidiary plate for direct attachment to such post or the like and to secure the fastening device to such subsidiary plate. If desired the connection between the fastening device and the subsidiary plate may be such as to enable the position of the fastening device to be varied. Thus for instance there may be provision for vertical adjustment so enabling the device to be easily adjusted to suit the height of the associated latch.

In cases where a fastening device according to the present invention is applied to a wooden post or the like, bolts, screws or the like may pass through a suitable part of such device into the post but in cases where it is applied to a concrete post I prefer to provide a shaft extending rearwardly from the body of the fastening device or from the above mentioned subsidiary plate (if provided), such shaft being adapted to pass through a hole in the post and having a screw-threaded end for engagement by a nut. In the latter arrangement claws, projections or the like may extend from the body of the fastening device or from the subsidiary plate as the case may be towards the opposed face of the post so as to oppose any tendency for said device or plate to turn when the nut is being tightened.

The above mentioned means for resiliently opposing sliding movements of the abutment and catch may consist of dash pots or springs, or buffers or the like of rubber or other suitable resilient material. I at present prefer to use spring means, however, such for instance as two compression springs with a stop extending from the keeper and abutment assembly between adjacent ends of such springs. If desired the spring loading may be variable in order to enable the device to be adapted for gates of widely varying weights.

Figure 4:
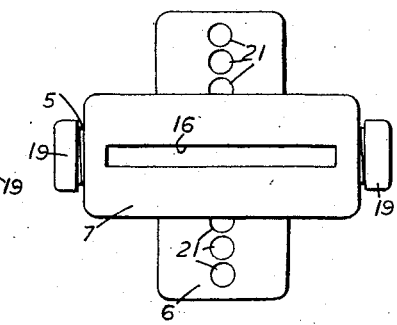
Figure 5:
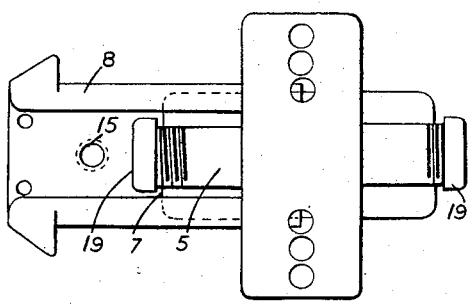
Figure 6:
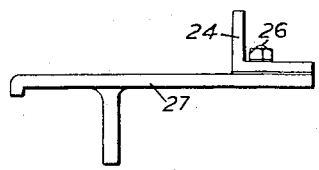
Figure 7:
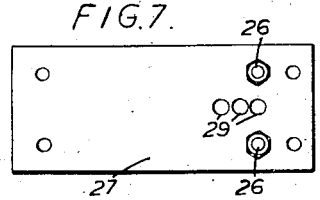
Figure 8:
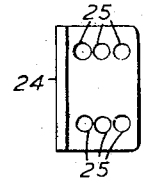
Figure 9:
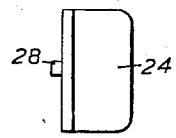

In order that the present invention may be well understood I will now describe, by way of examples only, some embodiments thereof with reference to the accompanying drawings in which:

Figure 1 is a part sectional and part broken elevation showing one form of fastener applied to a gate, Figure 2 is a broken plan view of the arrangement shown in Figure 1, Figure 3 is a front elevation of the fastener shown in Figures 1 and 2, Figure 4 is a front elevation of the body portion of the fastener shown in Figure 3, Figure 5 is a rear elevation of the fastener shown in Figure 3, Figure 6 is a plan view of a modification of one part of the fastener shown in the earlier figures, Figures 7, 8 and 9 are views of details of the arrangement shown in Figure 6, Figure 10 is a front elevation of a modified fastening arrangement showing the gate about to be fully closed, Figure 11 is a side view of the arrangement shown in Figure 10 but showing the gate in its fully closed position, Figure 11A is a section of a modified latch, Figure 12 is a composite plan view of the fastening means shown in Figure 10 but with the gate in a position intermediate the catches or keepers for cooperation with the fastener in retaining the gate in its fully closed and fully opened positions, the said parts being shown close together for convenience.

Figure 13 is an underneath plan view of a detail of the catch or keeper for retaining the gate in a closed condition, Figure 14 is a side elevation showing the gate retained in its fully opened position, Figure 15 is a broken front elevation showing another fastening arrangement for securing a gate to a gate post, Figure 16 is a view of a detail of the arrangement shown in Figure 15, Figures 17, 18 and 19 are views of modifications in certain details of the arrangement shown in Figure 15, Figures 20 and 21 are views of a modification of a detail of the arrangement shown in Figure 12 and Figures 22 to 25 are views of a modification of another detail of the arrangement shown in Figure 12 for cooperation with the part shown in Figures 20 and 21.

Referring to Figures 1 to 5, the fastening means comprise a latch applied for instance to a concrete gate 1 and a cooperating fastener applied to a concrete gate post 2, the latch comprising a latch member 3 pivotally mounted in a fitting 4 secured to the gate 1 by means of bolts or in any other convenient way.

The body portion of the aforesaid fastener comprises a tubular portion 5 having plates 6 and 7 formed integrally therewith for instance in a casting operation or secured thereto for instance in a welding or like operation, the plate 6 constituting the base plate of the device and the plate 7 constituting a platform spaced from but parallel to the said base plate.

A plate 8 is slidably mounted on the platform 7 and this plate is provided with an upwardly extending keeper 9 and a downwardly extending keeper 10 for cooperation with the latch 3, the provision of the two keepers 9 and 10 enabling the fastener to be applied to right and left hand gates. The plate 8 is slidably retained on the platform 7 by means of the channels shown at the top and bottom of such plate.

A plate 11 having an outwardly extending part 12 forming an abutment for the gate 1 is mounted on the slidable plate 8, said abutment plate having an overhanging lip portion 13 adapted to anchor such plate in the desired position and a stop 14 extending through a hole 15 in the plate 8 and through a slot 16 provided in the plate 7 and adjacent wall of the tubular portion 5.

The above mentioned stop 14 is located between two compression springs 17 and 18 which are retained in the tubular portion 5 by means of caps 19, 19 making screw threaded engagement with the ends of said tubular portion, there being greater range for movement of the plate 12 from its normal position in the direction in which it tends to move as a result of closing the gate than in the opposite direction i. e. from its normal position in the direction of recoil.

The base plate 6 may be directly secured to the gate post 2 by bolts or in any other convenient manner but we prefer to secure a back plate 20 to the gate post, for instance by means of a through bolt 21, and to secure the base plate 6 to said back plate by means of studs 22 extending from said back plate through the base plate. I also preferably provide a series of holes 21 in the base plate 6 so that the vertical height of the fastener can be varied by varying the holes selected for engagement by the said studs. In order to attain a very rigid mounting of the back plate 20 the corners 20' thereof may be down-turned and form claws which dig into the concrete and prevent any rotation of the fastener.

If desired the latch 3 may be provided with a light reflector 23.

The abutment plate 12 is spaced from the latch engaging catches 9 and 10 by a distance appropriate for cooperation with the gate concerned, and assuming that the fasteners are required for numbers of gates of the same thickness it is suitable for the abutment 12 to be applicable to the fastener in one determined position or even to be made integrally with the sliding plate 8. In some cases however the fastener may be required for gates of various thicknesses and in such cases it is desirable to provide for adjusting the position of the abutment.

Figures 6 to 9 show one mode of providing for such adjustment. In this arrangement the abutment 24 is in the form of a bracket and the base thereof has a series of holes 25 adapted to be selectively engaged by two studs 26, 26 extending from the plate 27, said plate 27 and abutment 24 replacing the above described plate 11 and abutment 12.

The base of the abutment 24 is preferably provided with a stud 28 and the plate 27 is provided with a plurality of cooperating holes 29 so as to provide an interlock which relieves the studs 26, 26 of undue stress when the gate strikes the abutment.

Assuming that the above described fastener is in operation the gate 1 may be forcibly swung towards its closed position without any danger of damaging the gate, the post, or the gate fittings as the gate will strike the resiliently mounted abutment 12 or 24 as the case may be with the result that its movement will be gradually and resiliently arrested. Moreover any resultant recoil of the gate will be readily and resiliently absorbed by the oppositely acting springs associated with the abutment. The provision of a catch (9 or 10) which moves with the abutment further ensures that a latch 3 will engage the catch immediately the latch has passed the highest point of the catch, i. e. the possibility of the gate recoiling before the latch has engaged the catch is entirely avoided.

If desired a fastener similar to the fastener applied to the gate post may be fitted to a wall, post or the like for cooperation with the latch when the gate is fully opened so affording the same degree of security and protection against damage when opening the gate as when closing it.

In the arrangements shown in Figures 1 to 9 the latch member pivots during its engaging and disengaging movements but it is also within the scope of the present invention to provide a slidable latch member. One such arrangement is shown in Figures 10 to 14 in application to double gates, e. g. double garage gates. Referring more specifically to these figures each gate, one of which is shown in some of the figures and designated 30 is provided with a slidable latch member 31 having an end member 32 of rectangular cross-section in plan view, the said end member being slidable within a guide casing 33 secured to a plate 34. The said plate 34 is secured to the gate by means of studs projecting from such plate through the gate and through a complementary attachment plate 35.

The inner part of the latch member 31 passes through a coil spring 36 housed in the casing 33, the said spring abutting at one end against the terminal member 32 and at the other end against a plate 37 which partially closes the adjacent end of the casing 33.

The spring 36 urges the latch member towards its outermost position and a collar 38 making screw-threaded engagement with the latch member is provided for adjusting the said outermost position of that member, said collar being locked in the required position for instance by means of a lock nut 39.

The above mentioned end member 32 is forked and a roller 40 is mounted in such fork for cooperation with a catch or keeper in a manner avoiding any undue friction.

The catches or keepers for retaining the gates in their closed positions comprise plates 41 and 42 secured to plates 43 and 44, the latter plates being slidably mounted on platforms 45 and 46. The plates 41 and 42 correspond to the plates 11 and 27 of the earlier described embodiments in that they carry abutments 47, 48 against which the gates strike when swung in a closing direction but they also include catches 49, 50, adapted to trap the fasteners of the respective gates when such gates strike the abutments 47, 48.

The platforms 45, 46 are secured to or formed integrally with tubular housings 49', 50' and these correspond to the housing 5 of the earlier described arrangement, i. e. they house springs engaging stops projecting from the plates 43, 44 with the result that the plates 41, 42 are movable both forwardly and rearwardly against spring action and the gate is cushioned in the manner already described.

The tubular housings 49' and 50' are mounted on or formed integrally with a base 51 and the latter may be secured to the ground in any convenient way.

The catches or keepers for retaining the gates in their fully opened conditions are similar to those above described subject to a part of the fastener as opposed to the gate itself abutting against the keeper. One of the catches or keepers for retaining a gate in an opened condition is shown in Figures 12 and 14 and comprises a catch or keeper plate 52 mounted on a slidable plate 53 which is cushioned in both directions by means of cooperating springs disposed in the tubular housing 54. The gate is resiliently arrested in its opening movement when the fastener strikes the abutment 55 of the keeper plate 52 and since by the time the fastener reaches that abutment the roller 40 will have passed over the keeper 56 the recoil of the gate will also be resiliently arrested.

If desired the end cups of the tubular housings 49, 50 and 54 may be provided with light reflectors.

Figures 15 and 16 show how a fastener of the kind shown in Figures 10 to 14 can be employed for securing a gate to a gate post. In all material respects the slidable latch mechanism and the keeper are similar to the constructions shown in Figures 10 to 14 and corresponding parts are accordingly designated by similar reference numerals and further description is unnecessary. It will be observed however that in Figure 15 the collar 38 is partially withdrawn to expose a guiding sleeve 57 projecting from the plate 37 and having an oil hole 58. The base plate of the keeper or catch is shown attached to a back plate of the kind referred to in connection with Figures 1 to 9 subject to such back plate being secured to the gate post 59 by means of screws 60, it being assumed that such post is made from wood. If however the post is of concrete then the arrangement described with reference to Figures 1 to 9 is preferably adopted. In order to render the device applicable for use with either of the said modes of attachment the plate may be provided with screw or bolt holes and with a detachable shaft.

Figures 17 to 19 show one way in which the keeper plate shown in Figures 15 and 16 may be modified to provide for the accommodation of gates of various thickness. In these figures the keeper plate is designated 42' and the abutment 48', the latter being separate from the keeper plate and adapted to be secured thereto by screwed studs 61, 61 engaging the appropriate holes of a series of holes 62 in the base 63 of an angle member, the other part of such angle member constituting the said abutment. The base 63 is preferably provided with a stud 64 adapted to engage the appropriate hole of a series of holes 65 so that the screwed studs 61 are relieved of any undue strain when the gate strikes the abutment 48'.

If desired the keepers shown in Figure 12 may be modified to provide for engaging gates of various thicknesses and in such cases the keeper plate may be in the form shown in Figures 20 and 21 and designated 66 and the abutment may be in the form shown in Figures 22 to 25 and designated 67, it being desirable for two studs 68, 68 to extend from the base of the abutment into the appropriate holes of the series of holes 69 as such abutment may be subjected to severe stresses in two directions for instance in the event of a car being driven thereover and it is desirable to relieve the securing studs 70, 71 of any such stresses. The base of the keeper 67 is of course provided with series of holes 72, 73 for selective engagement with the said securing studs.

If desired means may be provided for locking the above described fasteners in their engaged positions. Thus for instance suitable apertures may be provided for receiving bars or the like in positions preventing movement of the latch members such bars being secured in position by locks e. g. pad locks or being formed by parts of such locks.

Means may also be provided for locking the fastener in operative position if desired. Thus for instance the arrangement shown in Figure 11 may be modified in the manner shown in Figure 11A where corresponding parts are designated by similar reference numerals, the change principally residing in the use of a casing 33 and terminal member 32 of circular cross section instead of square cross-section, so providing for rotation of the latch member with respect to its casing. The said casing is further provided with a bayonet slot 33' for receiving a projection 32' on the terminal member. The latch 31 can accordingly be raised to its maximum extent and then turned about its axis in order to trap it in its freed position whenever it is desired to prevent the automatic trapping of the gate.

Whilst I have hereinbefore described some specific forms of device according to the present invention I wish it to be understood that there may be various changes or modifications without departing from the scope of such invention. Thus for instance dash-pots, rubber buffers or the like may be provided instead of springs for resiliently supporting the catch and abutment assembly and there may be variations in the particular way in which provision is made for the desired sliding movements of such assembly. Moreover there may be variations in the particular form of the catch or catches. It is also to be understood that the device may be made from any suitable material and of any desired size and that it may be applied to doors, gates or the like of various kinds although it is particularly advantageous when used in conjunction with doors, gates or the like made from concrete or otherwise of heavy construction.

I claim:

1. A fastening device for cooperation with a latch, said device including a body portion, a keeper for cooperation with the latch concerned and an abutment for the gate for which the device is intended, the said keeper and abutment being mounted for sliding movement with respect to said body portion and means being provided for offering resilient opposition to said sliding movement.

2. A fastening device as claimed in claim 1 wherein the said keeper and abutment are adjustable towards and away from one another in order to accommodate gates of various thicknesses.

3. A fastening device for cooperation with a latch, said device including a body portion, a keeper plate slidably mounted on said body portion, a keeper projecting from said keeper plate for cooperation with the latch concerned, an abutment adjustably mounted on said keeper plate for cooperation with the gate for which the device is intended, and means for resiliently opposing said sliding movement of said keeper plate with respect to said body portion.

4. A fastening device as claimed in claim 3 in which studs project from the keeper plate and a plurality of holes are provided in the abutment for cooperation with said studs, the spacing between the keeper and the abutment being variable within the limits afforded by the said plurality of holes.

5. A fastener device for cooperation with a latch, comprising a body portion, a keeper plate slidably mounted on said body portion, a keeper projecting from said keeper plate for cooperation with the latch concerned, an abutment projecting from said keeper plate for cooperation with the gate for which the device is intended, and means for resiliently opposing the said sliding movement of said keeper plate in both directions.

6. A fastener device for cooperation with a latch, comprising a body portion, a keeper plate slidably mounted on said body portion, a keeper projecting from said keeper plate for cooperation with the latch concerned, an abutment projecting from said keeper plate for cooperation with the gate for which the device is intended, and compression springs for resiliently opposing sliding movement of the keeper plate with respect to the said body portion in both directions.

7. A fastener device as claimed in claim 6 wherein the said body portion includes a tubular part and the said keeper plate is provided with a stop which projects into said tubular part, the said springs being located in said tubular part on each side of the said stop.

8. A fastener device for cooperation with a latch, said device comprising a body portion having a part of tubular form, a keeper plate slidably mounted on said body portion, a keeper projecting from said keeper plate for cooperation with the latch concerned, an abutment projecting from said keeper plate for cooperation with the gate for which the device is intended, a stop projecting from said keeper plate into the tubular part of said body portion, compression springs located in said tubular part on both sides of said stop and offering resilient opposition to sliding movement of said keeper plate, and removable end caps forming abutments for the outer ends of said springs.

9. A fastening device for cooperation with a latch, said device comprising a body portion, a keeper for cooperation with the latch concerned, an abutment for the gate for which the device is intended, the said keeper and abutment being slidable with respect to said body portion, means for resiliently opposing sliding movements of said keeper and abutment, a base plate forming part of said body portion and having alined holes therein, a back plate adapted to be secured to the gate post concerned, and studs projecting from said back plate and engageable in said holes in said base plate, the said holes being arranged in a series providing for adjusting the position of said base plate with respect to said back plate.

10. A fastening device according to claim 9 wherein said back plate is provided with a rearwardly extending shaft adapted to extend through the gate post concerned.

11. A fastening device according to claim 10 wherein said shaft is detachably fitted to said back plate and said base plate is provided with holes for receiving screws.

12. A fastener device for cooperation with a latch, said device comprising a body portion, a keeper for cooperation with said latch, an abutment for cooperation with the gate for which the device is intended, said abutment being disposed for serving as a stop when the gate is in a position in which the latch can move into engagement with the keeper, means for enabling said abutment and keeper to slide as a unit with respect to said body portion of the fastening device and means for resiliently opposing said sliding movement.

CHARLES JOHN RICE.

REFERENCES CITED

The following references are of record in the file of this patent:

UNITED STATES PATENTS

| Number | Name | Date |
|---|---|---|
| 155,166 | Norton | Sept. 22, 1874 |
| 198,931 | Craig | Jan. 8, 1878 |
| 853,764 | Brown | May 14, 1907 |
| 1,232,818 | Levy | July 10, 1917 |
| 1,488,611 | Phillips | Apr. 1, 1924 |
| 2,086,049 | Schlaman | July 6, 1937 |